(12) United States Patent
Di Giulio

(10) Patent No.: US 7,680,787 B2
(45) Date of Patent: Mar. 16, 2010

(54) DATABASE QUERY GENERATION METHOD AND SYSTEM

(75) Inventor: Domenico Di Giulio, Rome (IT)

(73) Assignee: International Business Machines Corporation, Armonk, NY (US)

( * ) Notice: Subject to any disclaimer, the term of this patent is extended or adjusted under 35 U.S.C. 154(b) by 222 days.

(21) Appl. No.: 11/696,382

(22) Filed: Apr. 4, 2007

(65) Prior Publication Data

US 2007/0239667 A1  Oct. 11, 2007

(51) Int. Cl.
*G06F 17/30* (2006.01)
(52) U.S. Cl. .................. 707/5; 707/10; 707/102
(58) Field of Classification Search .......... 707/2, 707/5, 10, 102; 715/234
See application file for complete search history.

(56) References Cited

U.S. PATENT DOCUMENTS

| | | | | |
|---|---|---|---|---|
| 5,276,870 | A * | 1/1994 | Shan et al. | 707/2 |
| 5,878,426 | A * | 3/1999 | Plasek et al. | 707/102 |
| 5,893,091 | A * | 4/1999 | Hunt et al. | 707/3 |
| 5,978,789 | A * | 11/1999 | Griffin et al. | 707/2 |
| 6,067,552 | A * | 5/2000 | Yu | 715/234 |
| 6,195,661 | B1 * | 2/2001 | Filepp et al. | 707/102 |
| 6,289,334 | B1 * | 9/2001 | Reiner et al. | 707/3 |
| 6,546,388 | B1 * | 4/2003 | Edlund et al. | 707/5 |
| 6,618,719 | B1 * | 9/2003 | Andrei | 707/2 |
| 6,757,670 | B1 * | 6/2004 | Inohara et al. | 707/3 |
| 7,333,981 | B2 * | 2/2008 | Dettinger et al. | 707/4 |
| 7,370,030 | B2 * | 5/2008 | Dettinger et al. | 707/2 |
| 7,469,248 | B2 * | 12/2008 | Agrawal et al. | 707/10 |
| 2001/0049685 | A1 * | 12/2001 | Carey et al. | 707/103 R |
| 2005/0210000 | A1 * | 9/2005 | Michard | 707/3 |
| 2006/0265385 | A1 * | 11/2006 | Agrawal et al. | 707/10 |
| 2008/0243767 | A1 * | 10/2008 | Naibo et al. | 707/2 |

FOREIGN PATENT DOCUMENTS

EP  747838 A1 * 12/1996

OTHER PUBLICATIONS

Jun Rao and Kenneth A. Ross ; Reusing invariants: a new strategy for correlated queries; 1998; International Conference on Management of Data, Proceedings of the 1998 ACM SIGMOD international conference on Management of data; pp. 37-48; retrieved from ACM digital library.*

Yingying Tao, Qiang Zhu, and Calisto Zuzarte; Exploiting common subqueries for complex query optimization; 2002; IBM Centre for Advanced Studies Conference, Proceedings of the 2002 conference of the Centre for Advanced Studies on Collaborative research; p. 12; retrieved from ACM digital library.*

* cited by examiner

*Primary Examiner*—Shahid A Alam
(74) *Attorney, Agent, or Firm*—Garg Law Firm, PLLC; Rakesh Garg; Jeffrey S LaBaw

(57) ABSTRACT

A process for generating SQL queries to retrieve requested information from a database, whilst applying requested search filters, involving defining a "base" query, which is the simplest SQL query that can be executed to retrieve the information requested by the user (i.e. without applying any search filter), and then use a separate module for each search filter to detect the existence of the table that is required to apply that filter, and possibly add a "WHERE" condition that includes the required table using a sub-query. For each module, if the table required to filter a particular attribute exists in the current query, the "WHERE" condition is added on that table, without adding any sub-query. If on the other hand the required table does not exist in the current query, a sub-query that navigates associations from the tables involved in the current query to the required on is added, and the "WHERE" condition is added to the required table within the sub-query.

15 Claims, No Drawings

DATABASE QUERY GENERATION METHOD AND SYSTEM

FOREIGN PRIORITY

The present patent application claims priority to application number 06112321.2 filed in the European Patent Office on Apr. 6, 2006.

FIELD OF THE INVENTION

The present invention relates to the dynamic generation of relational database query techniques.

BACKGROUND OF THE INVENTION

Software applications that make use of relational databases to implement persistence of data often use a wide set of SQL queries to retrieve filtered information based on search criteria. This happens because queries on objects that have meaning in the application domain often allow the definition of many search filters, which can be used by application users to restrict the set of resulting objects based on the values of attributes defined on the objects itself or on associated ones.

In this context, a major problem consists in defining a strategy for generating an SQL query to retrieve all the information requested, while at the same time applying all the requested search filters. In general, this problem is typically resolved by choosing one of the following strategies:

1. Use a general-purpose SQL query, including all the tables that may be required to filter results. If a filter that requires joining with a specific table is specified, a "WHERE" clause is added on the appropriate column of that table to implement the search, otherwise the table is included in the definition of the query, but no "WHERE" clause is added. Performance is affected by this solution, since the set of tables included in the definition of the query is always the largest possible.
2. Use a different SQL query for every combination of filters that can be specified, in order to use for each set of search attributes the best performing query, including only those tables that are required to create "WHERE" conditions for that set of attributes. The drawback of this solution is that the number of ad-hoc SQL queries to be created and maintained becomes very high, and grows exponentially with the number of search attributes that can be specified.
3. Implement only a subset of all possible queries, based on most frequently used combinations of search attributes and on performance considerations, and associate each combination of search filters to the most appropriate query within this subset. This is a "mixed" approach, which tries to balance benefits and drawbacks of the previous ones, but turns out to be technically challenging and tends to fall short if the number of attributes that can be specified in the search starts to grow.

For each entity type in the database, the number of possible search queries that can be executed against entities of that type is exponential in the number of available search filters on other linked entities that the user may want to specify in a request e.g. the application could provide the ability to search for "employees" by associated "managers" and/or assigned "projects": in this case, depending on whether or not the user chooses to specify each of the two filters, we end up with 4 possible queries.

Thus prior art approaches tend to maintain in the application code: 1) either each possible query separately, or 2) a single query, which corresponds to the most complex one and can be easily adapted to become a replacement for every other query. If solution 1) is selected, a very high number of queries may be required to maintain in the application code, which turns out to be a mess; if solution 2) is selected, there is only one query to maintain but it is the worst one for all cases when you don't need to join the information of some entities because search criteria are not applied to them.

SUMMARY OF THE INVENTION

According to the present invention there is provided a method of interrogating a database comprising a plurality of tables according to the appended independent claim 1, a database query structure according to the appended independent claim 6 and a computer program, a computer readable medium and a system according to the appended claims 8 to 10 respectively. Preferred embodiments are defined in dependent claims 1 to 5 and 7.

Further advantages of the present invention will become clear to the skilled person upon examination of the detailed description. It is intended that any additional advantages be incorporated herein.

The present invention offers the advantage with respect to the prior art approaches described above of executing the most performing query for each subset of attributes while still avoiding the drawback of exponential complexity.

DETAILED DESCRIPTION

There is provided an "autonomic" algorithm to dynamically generate database queries using sub-queries.

A "base" query is written, which is the simplest SQL query that can be executed to retrieve the information requested by the user (i.e. without applying any search filter), and a separate module is then used for each search filter to detect the existence of the table that is required to apply that filter, and possibly add a "WHERE" condition that includes the required table using a sub-query. Therefore, the process of creating the SQL query to be executed is the following:

1. Create a "base" SQL query, which is the simplest query that can be executed to retrieve all the information requested by the user, without applying search filters.
2. For each search filter, use a separate module to add the appropriate "WHERE" condition to the current query, using a sub-query if needed. Module K executes the following:
   a. If the table required to filter on attribute K exists in the current query, add the "WHERE" condition on that table, without adding any sub-query
   b. If the required table does not exist in the current query, add a sub-query that navigates associations from the tables involved in the current query to the required one, and add the "WHERE" condition to the required table within the sub-query There is thus provided a method of interrogating a database comprising a plurality of tables comprising the steps of: defining a set of anticipated database queries directed to one or more of said tables, and generating a base query directed only to tables common to all of said anticipated database queries. For each such anticipated database query a subquery module directed to tables not covered by said base query and required by a respective anticipated database query is generated. When a request for information from said database is received, a subquery module directed to tables not covered by the base query and required by a respective anticipated database query is selected, and added to the base module to form a refined query. This refined query is then submitted to the database.

The base query, subquery module and refined query are preferably expressed in the structured query language. In such a case, the subquery module may be added to the base module by means of the structured query language expression "where".

There is similarly provided a database query structure comprising a base query and a selected subquery module.

Consider the following example, including a table of employees, and a table of projects. Each row in the EMPLOYEE table references a row in the PROJECT table and another row of the EMPLOYEE table, to model the employee's manager. The logical schema is very simple and looks like the following:
EMPLOYEE(EMPLOYEE_ID, EMPLOYEE_NAME, MANAGER_ID, PROJECT_ID)
PROJECT(PROJECT_ID, PROJECT_NAME, PROJECT_BUDGET)

Tables 1 and 2 below are examples of tables according to these schema which will be used in the later examples:

TABLE 1

EMPLOYEE

| EMPLOYEE_ID | EMPLOYEE_NAME | MANAGER_ID | PROJECT_ID |
|---|---|---|---|
| 101 | Vladimir Ilic Lenin | 102 | 10 |
| 102 | Bill Gates | NULL | 10 |
| 103 | Tom Payne | 102 | 10 |
| 104 | Watt Tyler | 102 | 12 |

TABLE 2

PROJECT

| PROJECT_ID | PROJECT_NAME | PROJECT_BUDGET |
|---|---|---|
| 12 | Fortune | 1,000,000 |
| 11 | Glory | 2,000,000 |
| 10 | IBM Tivoli Workload Scheduler | 5,000,000 |

Now consider a query on employees that can optionally filter on the name of the assigned project. Depending on whether or not the search filter is applied, two different SQL queries might be used:

Either select EMPLOYEE_ID, EMPLOYEE_NAME, MANAGER_ID, PROJECT_ID from EMPLOYEE

This would return

TABLE 3

| 101 | Vladimir Ilic Lenin | 102 | 10 |
|---|---|---|---|
| 102 | Bill Gates | NULL | 10 |
| 103 | Tom Payne | 102 | 10 |
| 104 | Watt Tyler | 102 | 12 |

Or, select EMPLOYEE_ID, EMPLOYEE_NAME, MANAGER_ID, PROJECT_ID from EMPLOYEE inner join PROJECT on EMPLOYEE.PROJECT_ID=PROJECT.PROJECT_ID where PROJECT_NAME='IBM Tivoli Workload Scheduler'

This would return

TABLE 4

| 101 | Vladimir Ilic Lenin | 102 | 10 |
|---|---|---|---|
| 102 | Bill Gates | NULL | 10 |
| 103 | Tom Payne | 102 | 10 |

A typical solution to this problem is: 1) use always the second query, and add the "WHERE" clause on the project name only when needed, or 2) write and maintain both the queries, and use the most appropriate one depending on whether or not the filter on the project name is specified.

On the other hand, we could start by writing a "base" query:
select EMPLOYEE_ID, EMPLOYEE_NAME, MANAGER_ID, PROJECT_ID from EMPLOYEE which would return

TABLE 5

| 101 | Vladimir Ilic Lenin | 102 | 10 |
|---|---|---|---|
| 102 | Bill Gates | NULL | 10 |
| 103 | Tom Payne | 102 | 10 |
| 104 | Watt Tyler | 102 | 12 |

Then, the condition on the project name could be added only when needed, using a sub-query:
select EMPLOYEE_ID, EMPLOYEE_NAME, MANAGER_ID, PROJECT_ID from EMPLOYEE
where PROJECT_ID in (select PROJECT_ID
  from PROJECT
  where PROJECT_NAME='IBM Tivoli workload Scheduler')

The sub query alone would return

TABLE 6

| 10 |
|---|

So that the complete query would return

TABLE 7

| 101 | Vladimir Ilic Lenin | 102 | 10 |
|---|---|---|---|
| 102 | Bill Gates | NULL | 10 |
| 103 | Tom Payne | 102 | 10 |
| 104 | Watt Tyler | 102 | 12 |

The logic required to add the sub-query can be implemented by a separate module, which adds the sub-query and the "WHERE" clause on the sub-query only when needed.

A similar approach could be used to add a filter on the manager's name. A suitable sub query might be:
MANAGER_ID in (select EMPLOYEE_ID
   from EMPLOYEE
   where EMPLOYEE_NAME='Bill Gates')

Which alone would return

TABLE 8

| 102 |
|-----| a separate module would take care of adding a sub-query only when the filter is specified:
select EMPLOYEE_ID, EMPLOYEE_NAME, MANAGER_ID, PROJECT_ID from EMPLOYEE
where PROJECT_ID in (select PROJECT_ID
   from PROJECT
   where PROJECT_NAME='IBM Tivoli Workload Scheduler')
and MANAGER ID in (select EMPLOYEE_ID
   from EMPLOYEE
   where EMPLOYEE_NAME='Bill Gates')

Thus a refined query may he built including a number of subquery modules which together provide the required response. The step of selecting may thus comprise selecting a plurality of subquery modules corresponding in aggregate to all tables not covered by said base query and required by a respective anticipated database query, and wherein said refined query comprises said base query and said plurality of subquery modules.

So that the complete query would return

TABLE 9

| 101 | Vladimir Ilic Lenin | 102 | 10 |
| 103 | Tom Payne | 102 | 10 |

Notice that both modules check for the existence of the required table before adding the sub-query, so that they can be used also for queries that already join on that table. For instance, consider another query, used to retrieve all the information about employees and assigned projects:

select *
from EMPLOYEE inner join PROJECT on EMPLOYEE.PROJECT_ID=PROJECT.PROJECT_ID A call to the module that takes care of adding a search filter on the project name detects the existence of the PROJECT table, and just adds the appropriate "WHERE" condition:

select *
from EMPLOYEE inner join PROJECT on EMPLOYEE.PROJECT_ID=PROJECT. PROJECT_ID
where PROJECT_NAME='IBM Tivoli Workload Scheduler'

On the other hand, a call to the module that takes care of the manager's name filter can detect that a sub-query is needed to add the table required by the search condition:
select *
from EMPLOYEE inner join PROJECT on EMPLOYEE.PROJECT_ID=PROJECT. PROJECT_ID
where PROJECT_NAME='IBM Tivoli Workload Scheduler'
and MANAGER_ID in (select EMPLOYEE_ID
   from EMPLOYEE
   where EMPLOYEE_NAME='Bill Gates')

In other words, the algorim dynamically detects the structure of the current query and adds simple "WHERE" conditions or sub-queries as necessary. If using this solution, there's no need to maintain a number of different SQL queries, and at the same time the SQL query that is built is always the most performing one in terms of the number of tables involved.

Also notice that since there's a need to write only an additional module for every search filter, without changing the "base" query, the complexity of this solution grows linearly, and not exponentially, with the number of search filters, and the solution is easy to maintain.

The benefits of low complexity and high performance, are combined due to the need for only a base query, such as might be executed when no search filter is specified, and a number of subquery modules that may be equal to the number of possible search filters. When the user submits a new request, every subquery module checks if the corresponding search filter has been specified and decides whether or not the subquery that selects on the associated entity is needed. In the above embodiments described with respect to FIG. 1 there may be provided a module that can add a subquery on projects, and the other one that can add a subquery on managers, so with 2 modules you can create 4 queries). The number of subquery modules to be maintained is therefore equal to the number of available search filters on associated entities that the user may want to specify, which is logarithmic in the total number of possible search queries that the algorithm is able to build.

According to the approach described above, each subquery module may need to add a subquery predicate to the "where" clause of the base SQL query, and while doing this it needs to know what is the linkage between the base query and the subquery. The teaching of copending application (FR820050253) can be incorporated into the present invention so as to assist in this regard. Specifically, a "table path" may be defined, together with each SQL query that is generated, for every table instance involved in the query, together with a mapping to the alias used for that instance. The alias of the appropriate table from which a "fetch" function must fetch the data is found by executing a search over the set of "table paths", looking for the table path corresponding to that invocation of the function. The "table path" describes a path including all the tables that are "touched" when navigating the join tree from the first table to be considered to the current one. Thus a method of interrogating a database may involve generating a database query, and a data map describing the structure of table instances implicated in said database query. The map may take the form of a recursive data structure such as a tree. The database query is submitted to the database, and a response received from the database. The data map is traversed so as to iteratively apply an extraction process such as a fetch function to components of the response corresponding to each table instance implicated in the database query, thereby extracting required data from the response. By generating such a map when the base query is generated, the required information would be available when compiling the refined query to get the required aliases.

Although the invention has been described in terms of the structured query language, the skilled person will appreciate the invention may be implemented using any suitable database query language, such as for example IBM BS12, Tutorial D, TQL Proposal, Hibernate Query Language (HQL), OSQL, Quel or the Object Data Standard of the ODMG (Object Data Management Group).

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The invention claimed is:

1. A computer implemented method of interrogating a database comprising a plurality of tables, said method comprising the steps of:
defining a set of anticipated database queries directed to one or more of said tables in the database, the database executing in the data processing system;
generating a base query directed only to tables common to all of said anticipated database queries;
for each anticipated database query, generating a subquery module directed to tables not covered by said base query and required by a respective anticipated database query, wherein the subquery module includes logic to create a subquery and logic to create a filter;
receiving a request for information from said database;
selecting a subquery module directed to tables not covered by said base query and required by a respective anticipated database query;
adding an output of said selected subquery module to said base query to form a refined query, wherein the logic included in the subquery module further includes logic for not creating the subquery when a table used in the filter already exists in the refined query;
submitting said refined query to said database; and
responsive to submitting said refined query, receiving data from said database.

2. The method of claim 1 wherein said step of selecting comprises selecting a plurality of subquery modules corresponding in aggregate all tables not covered by said base query and required by a respective anticipated database query, and wherein said refined query comprises said base query and outputs of said plurality of subquery modules.

3. The method of claim 1 wherein said base query, an output of said subquery module and said refined query are expressed in the structured query language.

4. The method of claim 3 wherein an output of said subquery module is added to said base module by means of the structured query language expression "where".

5. The method of claim 1 comprising the further steps of:
generating a data map describing the structure of table instances implicated in said base query;
traversing said datamap so as to determine the linkage between said base query and said subquery module; and
adding a subquery predicate to said base query as a function of said linkage.

6. A computer program product in a computer readable tangible storage medium comprising instructions for carrying out the steps of a method when said computer program is executed on a computer, the method comprising the steps of:
defining a set of anticipated database queries directed to one or more of said tables, generating a base query directed only to tables common to all of said anticipated database queries;
for each anticipated database query, generating a subquery module directed to tables not covered by said base query and required by a respective anticipated database query, wherein the subquery module includes logic to create a subquery and logic to create a filter;
receiving a request for information from said database;
selecting a subquery module directed to tables not covered by said base query and required by a respective anticipated database query; and
adding an output of said selected subquery module to said base query to form a refined query, wherein the logic included in the subquery module further includes logic for not creating the subquery when a table used in the filter already exists in the refined query;
submitting said refined query to said database; and
responsive to submitting said refined query, receiving data from said database.

7. The computer program product of claim 6 wherein said step of selecting comprises selecting a plurality of subquery modules corresponding in aggregate all tables not covered by said base query and required by a respective anticipated database query, and wherein said refined query comprises said base query and outputs of said plurality of subquery modules.

8. The computer program product of claim 6 wherein said base query, an output of said subquery module and said refined query are expressed in the structured query language.

9. The computer program product of claim 8 wherein an output of said subquery module is added to said base module by means of the structured query language expression "where".

10. The computer program product of claim 6 comprising the further steps of:
generating a data map describing the structure of table instances implicated in said base query;
traversing said datamap so as to determine the linkage between said base query and said subquery module; and
adding a subquery predicate to said base query as a function of said linkage.

11. A system for interrogating a database comprising a plurality of tables, comprising:
a storage device including a storage medium, wherein the storage device stores computer usable program code; and
a processor, wherein the processor executes the computer usable program code, and wherein the computer usable program code comprises:

computer usable code for defining a set of anticipated database queries directed to one or more of said tables;

computer usable code for generating a base query directed only to tables common to all of said anticipated database queries;

computer usable code for generating a subquery module directed to tables not covered by said base query and required by a respective anticipated database query, wherein the subquery module includes logic to create a subquery and logic to create a filter;

computer usable code for receiving a request for information from said database;

computer usable code for selecting a subquery module directed to tables not covered by said base query and required by a respective anticipated database query;

computer usable code for adding an output of said selected subquery module to said base query to form a refined query, wherein the logic included in the subquery module further includes logic for not creating the subquery when a table used in the filter already exists in the refined query;

computer usable code for submitting said refined query to said database; and computer usable code for, responsive to submitting said refined query, receiving data from said database.

12. The system of claim 11 wherein said computer usable code for selecting comprises computer usable code for selecting a plurality of subquery modules corresponding in aggregate all tables not covered by said base query and required by a respective anticipated database query, and wherein said refined query comprises said base query and outputs of said plurality of subquery modules.

13. The system of claim 11 wherein said base query, an output of said subquery module and said refined query are expressed in the structured query language.

14. The system of claim 13 wherein an output of said subquery module is added to said base module by means of the structured query language expression "where".

15. The system of claim 11 further comprising:

computer usable code for generating a data map describing the structure of table instances implicated in said base query;

computer usable code for traversing said datamap so as to determine the linkage between said base query and said subquery module; and computer usable code for adding a subquery predicate to said base query as a function of said linkage.

* * * * *